(12) United States Patent
Lindström et al.

(10) Patent No.: US 8,565,099 B2
(45) Date of Patent: Oct. 22, 2013

(54) METHOD AND ARRANGEMENT IN A WIRELESS COMMUNICATION NETWORK

(75) Inventors: Magnus Lindström, Spånga (SE); Mats Sågfors, Kyrkslätt (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 328 days.

(21) Appl. No.: 12/996,127

(22) PCT Filed: Jan. 16, 2009

(86) PCT No.: PCT/SE2009/050032
§ 371 (c)(1),
(2), (4) Date: Dec. 3, 2010

(87) PCT Pub. No.: WO2009/148378
PCT Pub. Date: Dec. 10, 2009

(65) Prior Publication Data
US 2011/0096671 A1    Apr. 28, 2011

Related U.S. Application Data

(60) Provisional application No. 61/059,195, filed on Jun. 5, 2008.

(51) Int. Cl.
*H04L 1/00* (2006.01)
(52) U.S. Cl.
USPC .......................................... 370/242; 370/310
(58) Field of Classification Search
USPC .................................................. 370/310–350
See application file for complete search history.

(56) References Cited

U.S. PATENT DOCUMENTS

2005/0054358 A1* 3/2005 Zhang et al. .................. 455/509
2009/0129335 A1* 5/2009 Lee et al. ...................... 370/331

FOREIGN PATENT DOCUMENTS

EP       1 903 828 A1    3/2008

OTHER PUBLICATIONS

"Universal Mobile Telecommunications Systems (UMTS); Radio Resource Control (RRC); Protocol specification (3GPP TS 25.331 version 8.2.0 Release 8); ETSI TS 125 331" ETSI Standard, Europeans Telecommunications Standards Institute (ETSI), Sophi Antipolis Cedex, France, vol. 3-RS, No. V8.2.0, May 1, 2008, XP014042123 pp. 84-86, 179-180, 208-209, 175-182.
Ericsson: "Actions at RNC reset" 3GPP Draft; R2-020734 Actions at RNC Reset, $3^{rd}$ Generation Partnership Project (3GPP), Mobile Competence Centre; 650, Route Des Lucioles; F-06921 Sophia-Antipolis Cedex; France, No. Victoria; 20020514, Apr. 4, 2002, XP050272418; 28 pages.

(Continued)

*Primary Examiner* — Charles C Jiang
(74) *Attorney, Agent, or Firm* — Myers Bigel Sibley & Sajovec, P.A.

(57) ABSTRACT

A user equipment connection supervision method in a user equipment, of a network node initiated random access procedure to force a declaration of connection failure is provided. The user equipment is connected to a wireless communication network via a wireless connection to the network node. After receiving (401) one or more commands from the network node, to perform random access procedure, the user equipment performs one or more attempts to initiate random access procedure by sending (402) one or more access request messages to the network node as a response to the received command. When no response to the sent access request message is received from the network node within a predetermined threshold value, the user equipment declares (406) failure of the wireless connection.

12 Claims, 6 Drawing Sheets

(56) References Cited

OTHER PUBLICATIONS

International Search Report for PCT/SE2009/050032 dated May 27, 2009.

Written Opinion of the International Searching Authority for PCT/SE2009/050032 dated May 27, 2009.

International Preliminary Report on Patentability for PCT/SE2009/050032 dated Oct. 1, 2010.

* cited by examiner

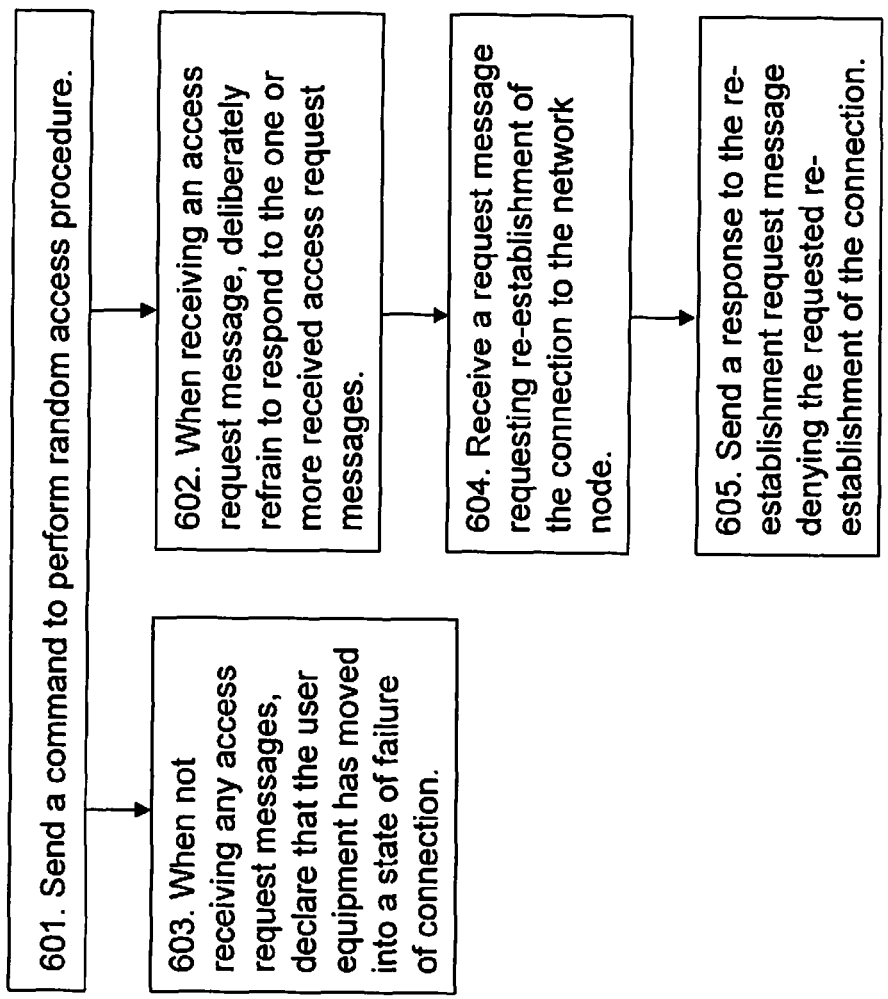

METHOD AND ARRANGEMENT IN A WIRELESS COMMUNICATION NETWORK

CROSS REFERENCE TO RELATED APPLICATION

This application is a 35 U.S.C. § 371 national stage application of PCT International Application No. PCT/SE2009/050032, filed on 16 Jan. 2009, which claims priority from United States Provisional Application No. 61/059,195 filed Jun. 5, 2008, the disclosures and contents of which are incorporated by reference herein in their entireties. The above-referenced PCT International Application was published in the English language as International Publication No. WO 2009/148378 A1 on 10 Dec. 2009.

TECHNICAL FIELD

The present invention relates to a method and an arrangement in a user equipment and a method and an arrangement in a network node. In particular, it relates to a network node initiated random access procedure to force a declaration of connection failure.

BACKGROUND

In communications systems in general, and in wireless communication systems in particular, bidirectional connectivity is typically implemented e.g., for application support and/or for control of the communications system. Disruption of connectivity or communication in either direction may lead to failure. Disruption of connectivity must therefore be detected, and appropriate actions to re-establish connectivity be taken.

In the cellular 3rd Generation Partnership Project (3GPP) Long Term Evolution (LTE) system, a connection supervision function may monitor the Downlink (DL) connectivity and User Equipment (UE)-initiated Random Access procedures. Random Access (RA) is a procedure typically used by the UE to request access to the system or resources when the UE discovers a need to acquire Uplink (UL) synchronization or a need to make an uplink transmission and no resources for the uplink transmissions are yet available to the UE. If a problem is detected, a timer is started, at the expiration of which a re-establishment procedure may be triggered. A first timer aims to give the condition an opportunity to be resolved before taking more invasive measures, such as a re-establishment request. A second timer may govern the time during which the UE may attempt a re-establishment if conditions are favourable. If the second timer expires, then the UE autonomously releases the RRC connection and goes to an Idle state.

In addition to UE-initiated RA procedures, LTE supports network-triggered RA procedures. A network-triggered RA procedure is used to force a UE, which does not have a valid uplink timing, to synchronize its UL to the timing at the evolved Node B (eNB). E.g., prior to the eNB making a DL transmission for which the UE will need to transmit Acknowledgment/Non-acknowledgment (ACK/NACK) feedback. Because of the non-zero duration of the RA and UL synchronization procedure, the resynchronization occurs in advance of making the DL transmission.

In 3GPP, it has been agreed that in the event that the RA procedure fails, the entity that initiated the RA procedure is responsible for repeating the procedure. In other words, the UE repeats and supervises a UE-initiated RA procedure and the network (e.g., the eNB) repeats and supervises a network-initiated RA procedure. Thus, if the network detects a problem with a network-initiated RA procedure, the network has the responsibility of appropriately instructing the UE to release or initiate re-establishment of the connection.

In communications systems, such as LTE, where data and control messages are encrypted, the UE and the network can only understand each other if they share a common view of the security parameters, including, for example, encryption and integrity protection algorithms, keys, counters, etc. Situations may exist where the security parameters available in the UE do not match the security parameters available in the network. For example, security parameters can be inaccurate or missing (e.g., due to a Handover (HO) where the UE goes to a target cell different from the cell that was prepared by the source eNB).

If the network, due to missing or inaccurate security parameters, cannot instruct the UE to release the connection or initiate connection re-establishment and the same instructions, for security reasons, cannot be sent unciphered and/or without integrity protection, the UE will be stuck in a state of broken connectivity.

SUMMARY

It is therefore an object of the present invention to provide a mechanism for improving connection supervision in a wireless communication network.

According to a first aspect of the present invention, the object is achieved by a user equipment connection supervision method in a user equipment, of a network node initiated random access procedure to force a declaration of connection failure. The user equipment is connected to a wireless communication network via a wireless connection to the network node. After receiving one or more command to perform random access procedure from the network node, the user equipment performs one or more attempts to initiate random access procedure by sending one or more access request messages to the network node as a response to the received command. When no response to the sent access request message is received from the network node within a predetermined threshold value, the user equipment declares failure of the wireless connection.

According to a second aspect of the present invention, the object is achieved by a network node initiated random access method in a network node for forcing a connection failure declaration of a wireless connection between a user equipment and a wireless communication network via the network node. The network node sends one or more commands to perform random access procedure to the user equipment. When the network node receives one or more access request messages from the user equipment as a response to the sent command, it deliberately refrains to respond to the one or more received access request messages. The refrained response will force the user equipment to declare failure of the wireless connection.

According to a third aspect of the present invention, the object is achieved by a user equipment connection supervision arrangement in a user equipment. The user equipment is adapted to be connected to a wireless communication network via a wireless connection to the network node. The user equipment arrangement comprises a receiving unit configured to receive one or more command to perform random access procedure from the network node, and a sending unit configured to perform one or more attempts to initiate random access procedure by sending one or more access request messages to the network node as a response to the received command. The user equipment arrangement further comprises a declaring unit configured to declare failure of the wireless connection when no response to the sent access request message is received from the network node within a predetermined threshold value.

According to a fourth aspect of the present invention, the object is achieved by an arrangement in a network node. The network node is adapted to be comprised in a wireless communication network, and is adapted to be connected to a user equipment via a wireless connection. The network node arrangement comprises a sending unit configured to send one or more commands to perform random access procedure to the user equipment, and a receiving unit configured to receive one or more access request messages from the user equipment as a response to the sent command. The network node arrangement further comprises a refraining unit configured to deliberately refrain to respond to the one or more received access request messages. The refrained response will force the user equipment to declare failure of the wireless connection.

Since the network node deliberately refrains to respond to the one or more received access request messages and the refrained response will force the user equipment to declare failure of the wireless connection, it is possible for the network node such as a base station, to control the connectivity of the user equipment controlled by the network node, such that a user equipment that are non-responsive, or whose means for providing higher-layer signalling are limited or unavailable, can be disconnected from the network node, which in turn improves connection supervision in a wireless communication network. Thus, the invention provides a solution for the network node to control the connectivity of all user equipments controlled by the network node. A user equipment whose connection is released by means of the present invention, may establish a new connection to the same or another radio base station, where the problem conditions resulting in a need to release the connection are alleviated.

BRIEF DESCRIPTION OF THE DRAWINGS

The invention is described in more detail with reference to attached drawings illustrating exemplary embodiments of the invention and in which:

FIG. 6 is a flow chart illustrating embodiments of a method in a network node.

DETAILED DESCRIPTION

The following detailed description refers to the accompanying drawings. The same reference numbers in different drawings may identify the same or similar elements. Also, the following detailed description does not limit the invention.

Embodiments described herein may provide arrangements and/or methods for a network node initiated random access procedure to force a declaration of connection failure. In one embodiment, the user equipment may count the number of failed or response-less network-initiated random access procedures and when a threshold is reached or exceeded, the user equipment may conclude that connectivity has been lost and release or attempt to re-establish the connection.

Figure 1:
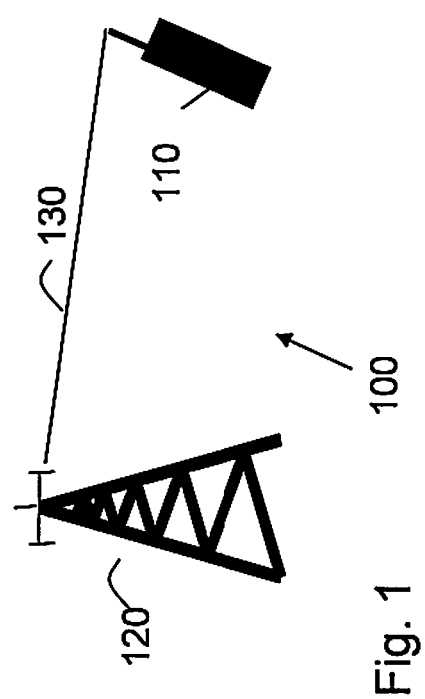
FIG. 1 is a schematic block diagram illustrating embodiments of a wireless communication network.

FIG. 1 depicts an exemplary wireless communication network 100, such as e.g. the E-UTRAN, also known as LTE, LTE-Adv, 3rd Generation Partnership Project (3GPP) WCDMA system, Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB).

The wireless communication network 100 comprises one or more user equipments 110 and one or a group of network nodes 120. Only one user equipment 110 and one network node 120 have been illustrated in FIG. 1 for simplicity. In practice, there may be more user equipments and network nodes. Moreover, it will be appreciated that a typical system may have additional components than illustrated in FIG. 1.

The user equipment 110 may be a mobile phone, a cell phone a Personal Digital Assistant (PDA), a lap top or any other network unit capable to communicate with the network node 120 via a wireless connection 130. The user equipment 110 may include one or more devices capable of sending/receiving voice and/or data to/from the network node 120.

The network node 120 may be a base station, a NodeB, an eNodeB (eNB) or any other network unit capable to communicate with the user equipment 110 over a wireless connection 130. The network node 120 may also be referred to as a network entity. The network node 120 may include one or more devices that receive voice and/or data from the user equipment 110 via an air interface, i.e. via the wireless connection 130, and transmit voice and/or data to user equipment 110 via the air interface, i.e. via the wireless connection 130.

In FIG. 1, the user equipment 110 is connected to the wireless communication network 100 via the wireless connection 130 to the network node 120. In some embodiments, the user equipment 110 is "RRC connected", where RRC refers to the Radio Resource Control (RRC) protocol that in UTRAN or E-UTRAN, among other things, configures and controls the connection between the base station and the user equipment.

Figure 2:
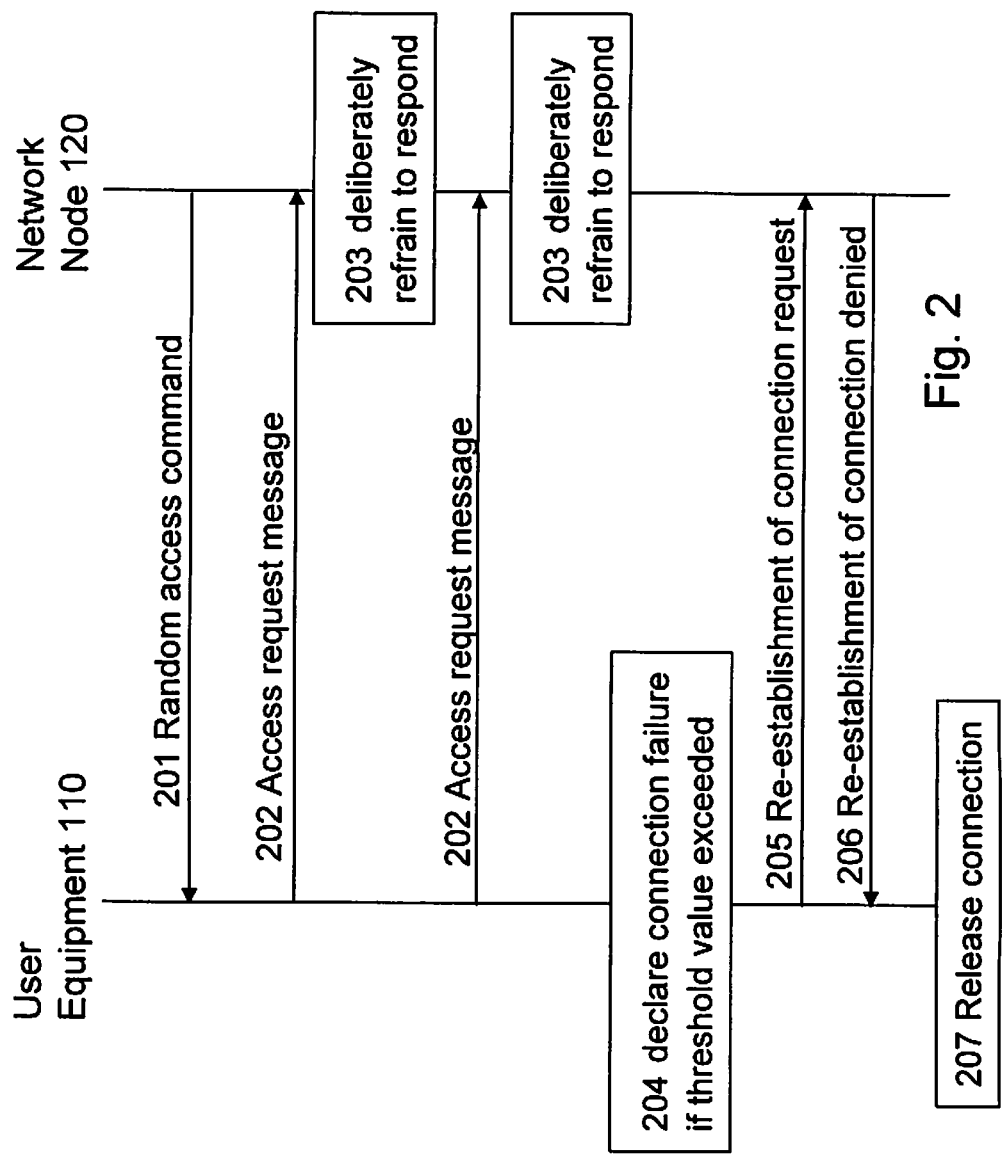
FIG. 2 is a combined signalling scheme and flow chart illustrating embodiments of a method.

In a scenario, the user equipment 110 in a cell cannot be released by a regular RRC release command. According to some embodiments, a method to release the connection is provided. Reasons for not being able to release the RRC connection of the user equipment 110 by existing mechanisms may comprise, for example, the aforementioned issue when the user equipment 110 is handed over to a cell to which the handover was not intended. In such a situation, the network node 120 may not have security keys to issue such a release. Other needs for the solution may include, for example, that the synchronization of the security parameters are lost for other reasons. Further, the solution as described below may also be needed in case the user equipment 110 fails to reach the network (e.g., due to uplink congestion or lack of user equipment power). FIG. 2 is a combined signalling scheme and flowchart of an exemplary process relating to embodiments of the present solution. Since the user equipment 110 cannot be released by a regular RRC release command, the user equipment 110 must be forced to declare connection failure, making it possible to release the connection or re-establish the connection. After a declaration of a connection failure, the user equipment 110 considers the present connection as unavailable, after which a re-establishment to recover the connection may be issued. Alternatively, the terminal may release the connection. In both cases, a recovered or a new connection, respectively, may be established in the same cell in which the connection failed or in a different cell following a cell selection procedure by the user equipment. A method for forcing a declaration of connection failure according to some embodiments of the present solution comprises the following method steps:

201. The process begins with the network node 120 sending one or several commands to the user equipment 110 to perform a random access procedure. Only one command is shown in FIG. 2. The command may e.g. be sent on a Physical Downlink Control Channel (PDCCH).

202. The user equipment 110 initiates a random access procedure in response to receiving the command(s). The user equipment 110 may initiate a contention prone random access procedure, or the access attempt may be issued on a resource dedicated to the user equipment 110. In either event, the user equipment 110 performs one or more random access attempts or one or more groups of random access attempts, by sending one or more access request messages or groups of access request messages to the network node 120. The random access procedure starts with the sending of the access request message to the network node. The access request message may e.g. be a random access preamble or a scheduling request message. If the access request message is not responded to by the network node 120, the user equipment 110 may try again by sending a further access request message to the network node 120. The access request messages may be sent on Physical Random Access Channel (PRACH). In FIG. 2, two access request messages are sent to the network node 120 in this step.

203. As a following step in a random access procedure, the network node 120 would have sent a response to the access request message. According to the present solution, none of the access request messages sent to the network node 120 are responded to. The network node 120 deliberately refrains to respond to the one or more received access request messages.

204. The refrained response forces the user equipment 110 to declare failure of the wireless connection. This will be performed when no response is received from the network node 120 within a predetermined threshold value. I.e. after a number of responseless access request messages or after sending access request messages until a time limit exceeds, which number or time limit is specified in the threshold value, the user equipment 110 gives up and declares failure of the wireless connection. The threshold value will be described more in detail below. The declaration of failure of the wireless connection, is a change of "state", where the user equipment 110 before the declaration assumes that the connection is ok. After the declaration, the user equipment 110 assumes that the connection is not available, and the connection must either be recovered or released.

205. This is an optional step. In the event when the user equipment 110 declares a connection failure, the user equipment 110 may attempt to perform a connection re-establishment request. This may e.g. be a RRC connection re-establishment request. The connection re-establishment request may e.g. be sent on the Common Control Channel (CCCH). If the re-establishment request fails, then user equipment 110 may go to the idle state.

206. This is also an optional step. If the network node 120 wants to release the connection, it may send a message to the user equipment 110 as a response to the re-establishment request. The message comprises a denying of the requested re-establishment of the wireless connection.

207. This is a further optional step. In the event when the user equipment 110 declares a connection failure the user equipment 110 may alternatively go directly into an idle state, i.e. release the connection to the network. In some embodiments the release is confirmed to the network node 120.

In some embodiments the user equipment 110 may increment a counter when the random access attempt or group of random access attempts fails. The number of random access attempts or groups of random access attempts that are required before a connection failure is declared (step 204) in the user equipment 110, may be governed by a counter. The counter is incremented for each failed random access attempt or for each group of failed random access attempts. The user equipment 110 issues a connection failure if the counter reaches or exceeds a threshold value. This threshold value may be related to as a PREAMBLE_TRANS_MAX or "preambleTransMax". A failed random access attempt means that no response to the random access attempt is received from the network node 120, the response cannot be decoded or is intended for another user equipment. The user equipment 110 may determine if the counter value equals or exceeds the threshold value. For example, the user equipment 110 may compare the counter value to the threshold value. If the counter value does not equal or exceed the threshold value, processing may proceed with the user equipment 110 performing another random access attempt or group of random access attempts. If, on the other hand, the counter value equals or exceeds the threshold value, user equipment 110 declares a connection failure (step 204).

In some embodiments, the user equipment 110 may initiate a timer in response to receiving the command(s) when or before sending the random access request messages in step 202. The user equipment 110 may alternatively initiate the timer at other times. In this embodiment, the governance of failed random access attempts issued by the network can be implemented by the timer, where a connection failure is issued if the user equipment 110 has not received any response to one or several random access attempts prior to the timer reaching or exceeding a threshold value represented by a period of time.

The user equipment 110 may determine if the timer has reached or exceeded the threshold value by e.g. compare the timer value to the threshold value. If the timer value does not equal or exceed the threshold value, a further random access attempt or group of random access attempts may be performed. If, on the other hand, the timer value equals or exceeds the threshold value, the user equipment 110 declares the connection failure (step 204).

As mentioned above the access request message may e.g. be a random access preamble or a scheduling request message. The access request message may also be e.g. a random access preamble or in case of contention-based random access, also the message comprising user equipment identity information or a sequence of random access preamble+random access response+message with user equipment identity information. This means that the message with user equipment identity information may be part of the access request message.

Figure 3:
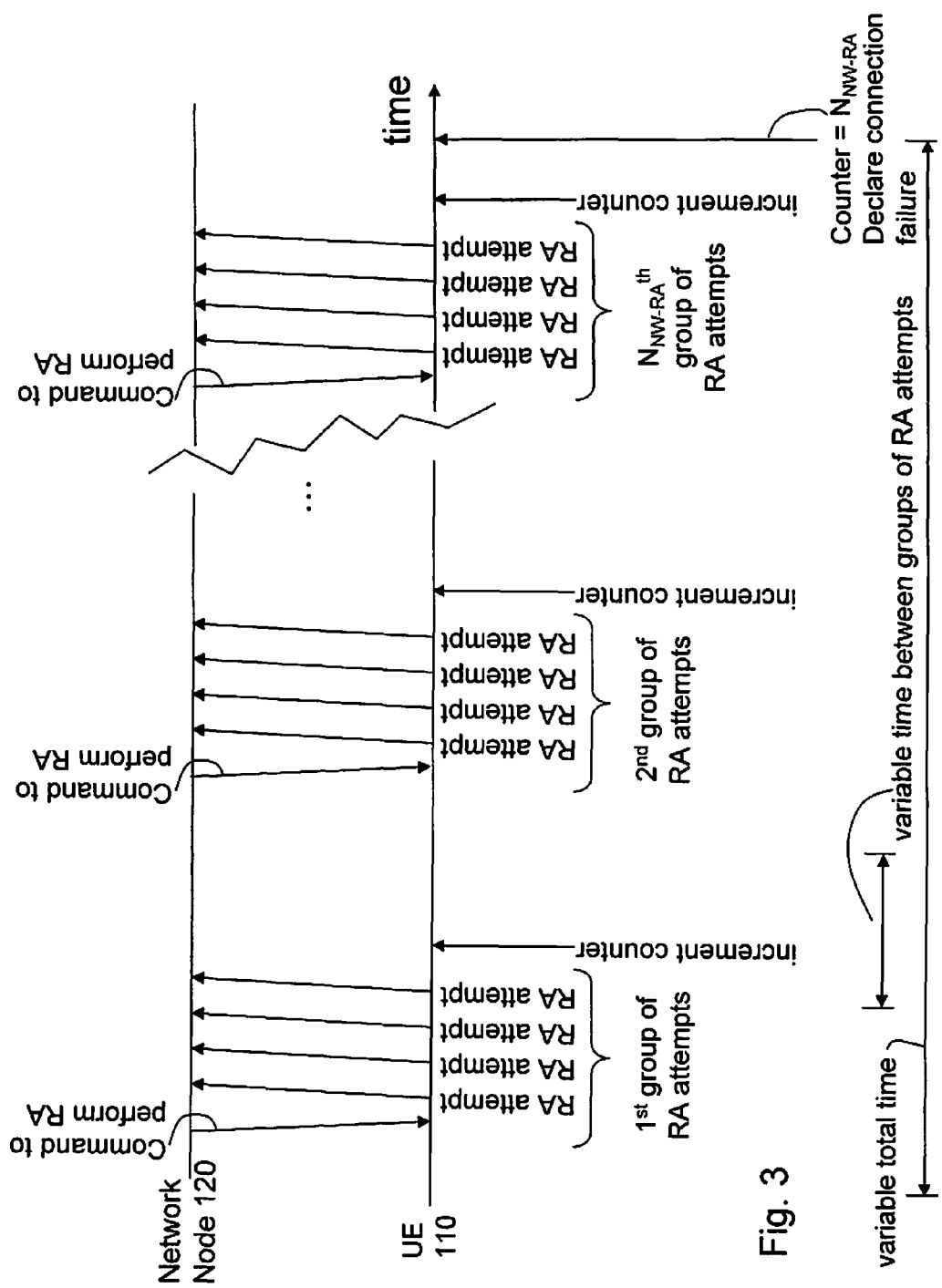
FIG. 3 is a schematic signalling scheme illustrating embodiments of a method.

One exemplary benefit of the counter-based solution over the timer-based solution is that it allows the network more freedom in the scheduling of each group of random access attempts. For example, the network may, for resource efficiency and/or availability reasons, require distributing the random access attempts over time in a fashion not known a priori. With the counter-based approach, the network node 120 may configure the user equipment 110 to count a number of failed access attempts e.g. groups of failed access attempts, each of which comprises N Radio Access (RA) attempts, with a variable time between the $N_{NW-RA}$ groups before declaring connection failure, where N is the number of groups, and NW-RA is network-oriented random access attempts. To increase reliability for the event that one or more commands to the user equipment 110 to perform the random access procedure is lost, the network node 120 may send a number of commands which is larger than the predetermined threshold for declaring connections failure e.g., over provisioning of random access opportunities, thereby ensuring that the user equipment 110 can count a certain number of random access attempts or groups of RA attempts. This is illustrated in an example of FIG. 3.

With the timer-based approach, the timer may be configured to always cover the longest expected duration for performing the $N_{NW-RA}$ groups of N attempt RA attempts, based on the longest inter-group time needed by the network.

The above-described embodiments also cover the situation where the network node 120 deliberately refrains from responding to the radio access attempts it has requested from the user equipment 110, thereby forcing user equipment 110 into declaring the radio link as failed, i.e. connection failure, and thereby ensure that the user equipment 110 releases the connection or first issues an re-establishment request before going to idle e.g., if the re-establishment fails. By this mechanism, it is possible for the network node 120 to release the user equipment 110 without having any valid security association with user equipment 110.

The above-described embodiments also cover the situation where the network node 120, at discrete time intervals, may check if the connectivity to the user equipment 110 is available by commanding the user equipment 110 to perform one or several random access attempts. If no random access attempts, i.e. access request messages, are received by the network node 120, then the network node 120 may assume that the connectivity to user equipment 110 is lost, and declares that the user equipment 110 has, or will move into a state of a failed connection or Idle state. This may depend on whether the user equipment 110 issues a connection re-establishment request, e.g. a RRC a connection re-establishment request, or if the user equipment 110 goes directly into the Idle state as described above.

Without the embodiments as described herein, in which the user equipment 110 shall declare a failure if the radio access attempts issued do not receive any response from the network node 120, the user equipment 110 would possibly remain in connected state, while the network node 120 would assume that the connectivity is lost. Therefore, an important benefit of the embodiments described herein is that the user equipment 110 can be moved into an Idle state, where the user equipment 110 is allowed to select another cell or another Radio Access Technology to ensure that the connectivity to a network can be resumed.

Figure 4:
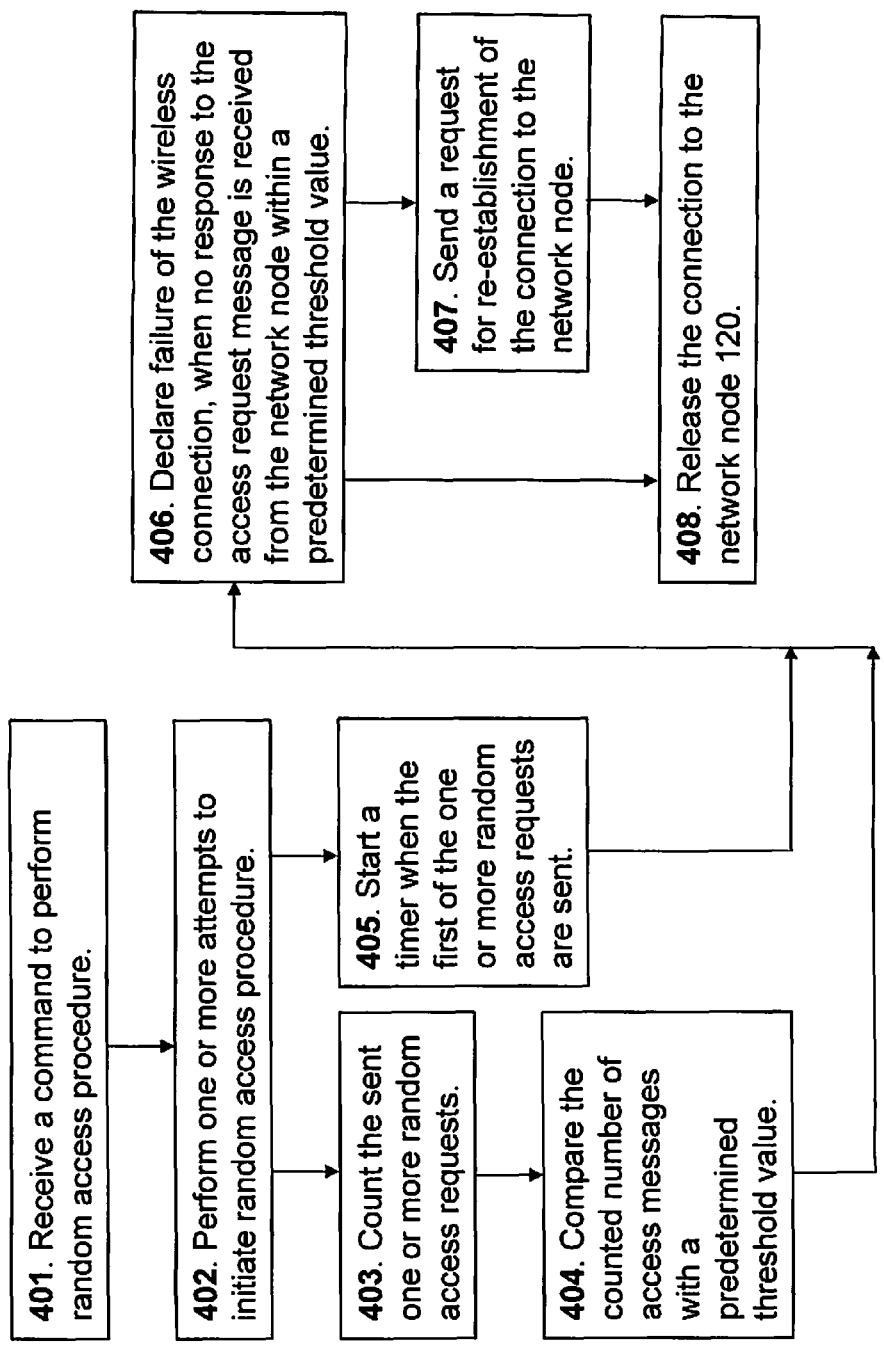
FIG. 4 is a flow chart illustrating embodiments of a method in a user equipment.

The user equipment connection supervision method steps in the user equipment 120 of a network node initiated random access procedure to force a declaration of connection failure according to some embodiments will now be described with reference to a flowchart depicted in FIG. 4. As mentioned above, the user equipment 110 is connected to a wireless communication network 100 via a wireless connection 130 to the network node 120. The wireless connection 130 may be represented by a RRC connection. The method comprises the steps of:

401. In this step the user equipment 110 receives one or more commands from the network node 120, to perform random access procedure.

402. As a response to the received command, the user equipment 110 performs one or more attempts to initiate random access procedure by sending one or more access request messages to the network node 120.

In some embodiments, the one or more access request messages are represented by one or more groups of access request messages.

403. This is an optional step. In some embodiments the user equipment 110 counts the one or more access request messages that are sent to the network node 120.

In some embodiments, the access request messages that are that are both sent and not responded to by the network node 120 that are counted.

404. This is also an optional step. In the embodiments wherein step 403 of counting is performed, the user equipment 110 compares the counted number of access request messages with a predetermined threshold value. The predetermined threshold value is in these embodiments represented by the number of sent access requests not responded to, that are required to trigger a declaration of failure of the wireless connection 130 in the step 406.

405. This is an optional step being an alternative to the steps 403 and 404. According to some embodiments the predetermined threshold value is represented by a time period during which the user equipment 110 will send the one or more access requests in step 402. In these embodiments the user equipment 110 may start a timer when the first of the one or more access request messages are sent and when the timer exceeds the time period, performing the next step of declaring failure of the wireless connection.

406. When no response to the sent access request message is received from the network node 120 within a predetermined threshold value, the user equipment 110 declares failure of the wireless connection.

In some embodiments, the predetermined threshold value is represented by the maximum number of sent access requests not responded to.

In some other embodiments, the predetermined threshold value is represented by a time period during which the user equipment 110 is to send the one or more access requests.

407. This is an optional step. In some embodiments the user equipment 110 sends a request message to the network node 120, requesting re-establishment of the connection to the network node 120, after receiving a denial of a response to the re-establishment request sent in step 406.

408. In this optional step the user equipment may release the connection to the network node 120, after receiving a denial of a response to the re-establishment request sent in step 406.

Figures 5, 7:
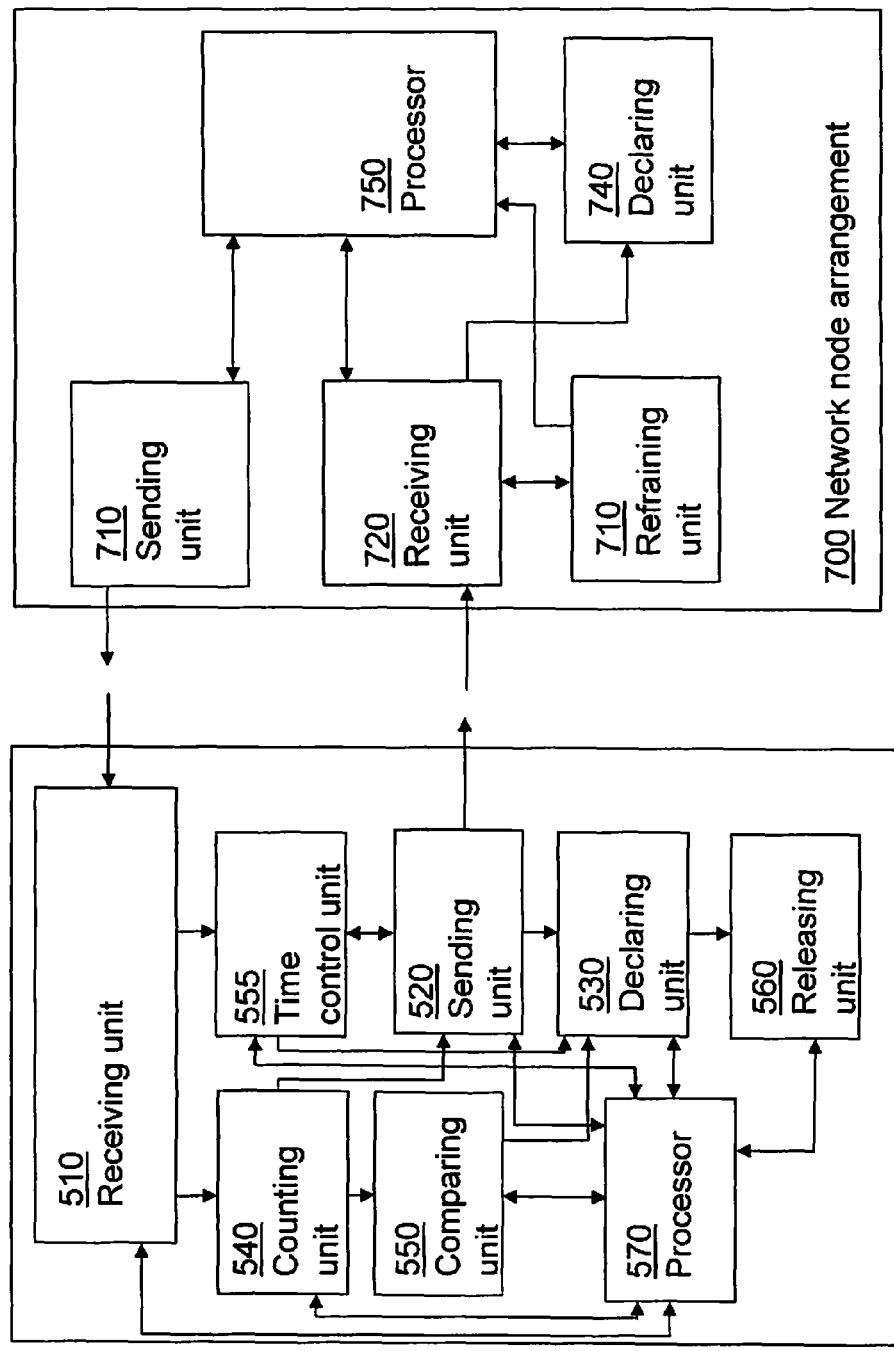
FIG. 5 is a schematic block diagram illustrating embodiments of a user equipment arrangement.
FIG. 7 is a schematic block diagram illustrating embodiments of a network node arrangement.

To perform the user equipment connection supervision method steps above of a network node initiated random access procedure to force a declaration of connection failure, the user equipment 110 comprises an arrangement 500 depicted in FIG. 5. As mentioned above, the user equipment 110 is adapted to be connected to a wireless communication network 100 via a wireless connection 130 to the network node 120. In some embodiments the wireless connection 130 is represented by a RRC connection.

The user equipment arrangement 500 comprises a receiving unit 510 configured to receive one or more command to perform random access procedure from the network node 120.

The user equipment arrangement 500 further comprises a sending unit 520 configured to perform one or more attempts to initiate random access procedure by sending one or more access request messages to the network node 120 as a response to the received command.

The user equipment arrangement 500 further comprises a declaring unit 530 configured to declare failure of the wireless connection 130 when no response to the sent access request message is received from the network node 120 within a predetermined threshold value.

The user equipment arrangement 500 may further comprise a counter 540 configured to count the one or more access request messages that are sent 120.

In some embodiments the user equipment arrangement 500 further comprises a comparing unit 550 configured to compare the counted number of access request messages with the predetermined threshold value. The predetermined threshold value may in some embodiments be represented by the number of sent access requests not responded to, that are required to trigger the declaration unit 530 to declare failure of the wireless connection 130.

In some embodiments, the predetermined threshold value is represented by a time period during which the user equipment 110 will send the one or more access requests. In these embodiments, the user equipment arrangement 500 further comprising a time control unit 555 configured to start a timer when the first of the one or more access request messages are sent. When the timer exceeds the time period, the declaring unit 530 is configured to perform the declaration of failure of the wireless connection 130.

In some embodiments the sending unit 520 further is configured to send a request message to the network node 120, requesting re-establishment of the connection to the network node 120.

In some embodiments the further comprises a releasing unit 560 configured to release the connection to the network node 120 when a failure of the wireless connection 130 has been declared.

The network node initiated random access method steps in the network node 120, for forcing a connection failure declaration of the wireless connection 130 between the user equipment 110 and the wireless communication network 100 via the network node 120, according to some embodiments will now be described with reference to a flowchart depicted in FIG. 6. The method comprises the steps of:

601. In this step, the network node 120 sends one or more commands to the user equipment 110, to perform random access procedure.
  In some embodiments, the number of commands is larger than the predetermined threshold value used by the user equipment 110 for sending access request messages before declaring failure of the wireless connection.
602. When the network node 120 receives one or more access request messages from the user equipment 110 as a response to the sent command, it deliberately refrains to respond to the one or more received access request messages. The refrained response will force the user equipment 110 to declare failure of the wireless connection 130.
603. This is an optional step. When the network node 120 not receives any access request messages from the user equipment 110 as a response to the sent command, it may declare that the user equipment 110 has or will move into a state of failure of the wireless connection.
604. This is an optional step. The network node 120 receives a request message from the user equipment 110, requesting re-establishment of the connection to the network node 120. The re-establishment request message was sent by the user equipment 110 after declaring failure of the wireless connection 130.
605. In some embodiments, the network node sends a message to the user equipment 110 as a response to the re-establishment request message and denies the requested re-establishment of the wireless connection 130.

To perform the network node initiated random access method steps above, the network node 120 comprises an arrangement 700 depicted in FIG. 7. As mentioned above, the network node 120 is adapted to be comprised in the wireless communication network 100, and is adapted to be connected to a user equipment 110 via a wireless connection 130.

The network node arrangement 700 comprises a sending unit 710 configured to send one or more commands to perform random access procedure to the user equipment 110.

In some embodiments, the sending unit 710 further is configured to send a number of commands that is larger than a predetermined threshold value used by the user equipment 110 for sending access request messages before declaring failure of the wireless connection.

The network node arrangement 700 further comprises a receiving unit 720 configured to receive one or more access request messages from the user equipment 110 as a response to the sent command.

The network node arrangement 700 further comprises a refraining unit 730 configured to deliberately refrain to respond to the one or more received access request messages. The refrained response will force the user equipment 110 to declare failure of the wireless connection 130.

In some embodiments, the network node arrangement 700 further comprises a declaring unit 740 configured to declare that the user equipment 110 has or will move into a state of failure of the wireless connection 130, when the network node 120 does not receive any access request messages from the user equipment 110 as a response to the sent command.

In some embodiments the receiving unit 720 further is configured to receive a request message from the user equipment 110, requesting re-establishment of the connection to the network node 120. The re-establishment request message is sent by the user equipment 110 after declaring failure of the wireless connection 130.

In some embodiments, the sending unit 710 further is configured to send a message to the user equipment 110 as a response to the re-establishment request message, denying the requested re-establishment of the wireless connection 130, when the network node 120 want to release the wireless connection.

The present mechanism for forcing a connection failure declaration of a wireless connection, may be implemented through one or more processors, such as a processor 570 in the user equipment arrangement 500 depicted in FIG. 5 or the processor 750 in the network node arrangement 700 depicted in FIG. 7, together with computer program code for performing the functions of the present solution. The program code mentioned above may also be provided as a computer program product, for instance in the form of a data carrier carrying computer program code for performing the present solution when being loaded into the user equipment 110 or the network node 120. One such carrier may be in the form of a CD ROM disc. It is however feasible with other data carriers such as a memory stick. The computer program code can furthermore be provided as pure program code on a server and downloaded to the user equipment 110 or the network node 120 remotely.

The foregoing description of embodiments provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5 and 7, the order of the blocks may vary in other embodiments. Moreover, non-dependent blocks may be implemented in parallel. Therefore, the above embodiments should not be taken as limiting the scope of the invention, which is defined by the appending claims.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A network node initiated random access method in a network node for forcing a connection failure declaration of a wireless connection between a user equipment and a wireless communication network via the network node, the method comprising:
   sending a command to the user equipment instructing the user equipment to perform a random access procedure; and
   in response to receiving one or more access request messages from the user equipment as a response to the sent command, deliberately refraining to respond to the one or more received access request messages, which refrained response will force the user equipment to declare failure of the wireless connection.

2. The method according to claim 1, further-comprising:
   in response to not receiving any access request messages from the user equipment as a response to the sent command, declaring that the user equipment has or will move into a state of failure of the wireless connection.

3. The method according to claim 1, further comprising:
   receiving a re-establishment request message from the user equipment requesting re-establishment of the connection to the network node, which re-establishment request message was sent by the user equipment after declaring failure of the wireless connection.

4. The method according to claim 3, further comprising:
   sending a message to the user equipment as a response to the re-establishment request message, denying the requested re-establishment of the wireless connection.

5. The method according to claim 1, wherein sending the command comprises sending a number of commands, which number of commands is larger than a predetermined threshold value used by the user equipment for sending access request messages before declaring failure of the wireless connection.

6. A network node for use in a wireless communication network and that is adapted to be connected to a user equipment via a wireless connection, the network node comprising:
   a processor configured to send a command to perform a random access procedure to the user equipment;
   wherein the processor is further configured to receive one or more access request messages from the user equipment as a response to the command; and
   the processor is further configured to deliberately refrain to respond to the one or more received access request messages, which refrained response will force the user equipment to declare failure of the wireless connection.

7. The network node according to claim 6, wherein the processor is further configured to declare that the user equipment has or will move into a state of failure of the wireless connection, in response to not receiving any access request messages from the user equipment as a response to the sent command.

8. The network node according to claim 6, wherein the processor is further configured to receive a re-establishment request message from the user equipment requesting re-establishment of the connection to the network node, which re-establishment request message is sent by the user equipment after declaring failure of the wireless connection.

9. The network node according to claim 8, wherein the processor is further configured to send a message to the user equipment as a response to the re-establishment request message, denying the requested re-establishment of the wireless connection.

10. The network node according to claim 6, wherein the processor is further configured to send a number of commands, which number of commands is larger than a predetermined threshold value used by the user equipment for sending access request messages before declaring failure of the wireless connection.

11. A network node initiated random access method in a wireless communication network for forcing a connection failure declaration of a wireless connection between a user equipment and the wireless communication network via a network node, the method comprising:
    sending, from the network node to the user equipment, a command to perform a random access procedure;
    the user equipment performing one or more attempts to initiate the random access procedure by sending one or more access request messages to the network node as a response to the received command;
    in response to receiving one or more access request messages from the user equipment as a response to the sent command, the network node deliberately refraining to respond to the one or more received access request messages; and
    in response to receiving no response to the one or more sent access request messages by the user equipment from the network node within a predetermined threshold value, the user equipment declaring failure of the wireless connection, the predetermined threshold value being represented by a maximum number of sent access request messages not responded to and/or a time period during which the user equipment is to send the one or more access request messages.

12. A wireless communication network, comprising:
    a user equipment comprising a first processor; and
    a network node that is adapted to be connected to the user equipment via a wireless connection, and that comprises a second processor;
    wherein the second processor is configured to send a command to perform a random access procedure from the network node to the user equipment;
    wherein the first processor is configured to perform one or more attempts to initiate the random access procedure by sending one or more access request messages to the network node as a response to the command;
    wherein the second processor is configured to deliberately refrain to respond to the one or more access request messages; and
    wherein the first processor is configured to declare failure of the wireless connection in response to receiving no response to the one or more access request messages from the network node within a predetermined threshold value, the predetermined threshold value being represented by a maximum number of sent access request messages not responded to and/or a time period during which the user equipment is to send the one or more access request messages.

* * * * *

UNITED STATES PATENT AND TRADEMARK OFFICE
CERTIFICATE OF CORRECTION

PATENT NO. : 8,565,099 B2  
APPLICATION NO. : 12/996127  
DATED : October 22, 2013  
INVENTOR(S) : Lindstrom et al.

Page 1 of 1

It is certified that error appears in the above-identified patent and that said Letters Patent is hereby corrected as shown below:

In the Drawings:

In Fig. 7, Sheet 5 of 6, delete "  " and insert --  --, therefor.

In the Specifications:

In Column 7, Line 56, delete "user equipment 120" and insert -- user equipment 110 --, therefor.

Signed and Sealed this
Fifteenth Day of April, 2014

Michelle K. Lee
*Deputy Director of the United States Patent and Trademark Office*